(12) United States Patent
Ito et al.

(10) Patent No.: US 9,616,940 B2
(45) Date of Patent: Apr. 11, 2017

(54) VEHICLE LOWER PORTION STRUCTURE

(71) Applicant: TOYOTA JIDOSHA KABUSHIKI KAISHA, Toyota-shi, Aichi (JP)

(72) Inventors: Keita Ito, Nisshin (JP); Masahiro Ishikawa, Toyota (JP); Kenichiro Yoshimoto, Tokai (JP); Naoya Sakaguchi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/032,361

(22) PCT Filed: Sep. 2, 2014

(86) PCT No.: PCT/JP2014/073600
§ 371 (c)(1),
(2) Date: Apr. 27, 2016

(87) PCT Pub. No.: WO2015/075997
PCT Pub. Date: May 28, 2015

(65) Prior Publication Data
US 2016/0280283 A1 Sep. 29, 2016

(30) Foreign Application Priority Data

Nov. 19, 2013 (JP) .................................. 2013-239165

(51) Int. Cl.
*B62D 25/00* (2006.01)
*B62D 25/20* (2006.01)
(Continued)

(52) U.S. Cl.
CPC ........ *B62D 25/2072* (2013.01); *B60R 13/043* (2013.01); *B62D 21/03* (2013.01); *B62D 25/2036* (2013.01)

(58) Field of Classification Search
CPC B62D 25/2072; B62D 21/03; B62D 25/2036; B60R 13/043
(Continued)

(56) References Cited

U.S. PATENT DOCUMENTS 6,893,064 B2 * 5/2005 Satou ..................... B60R 19/18
293/132
7,481,484 B2 * 1/2009 Hirano .................... B60R 19/12
180/68.4
(Continued)

FOREIGN PATENT DOCUMENTS

EP        1598242 A1   11/2005
JP    2005-053419 A    3/2005
JP    2010-208408 A    9/2010

*Primary Examiner* — Joseph D Pape
(74) *Attorney, Agent, or Firm* — Oliff PLC

(57) ABSTRACT

A vehicle lower portion structure has: an undercover that is fixed to a lower portion of a vehicle body, and that covers a bottom surface side of the vehicle body; rockers that extend in a vehicle longitudinal direction at both sides in a vehicle transverse direction at the lower portion of the vehicle body; and rocker moldings that are fixed to the lower portion of the vehicle body, and are disposed at vehicle transverse direction outer sides of the undercover, and are provided from vehicle transverse direction outer sides of the rockers to vehicle lower sides. End portions at the vehicle transverse direction outer sides of the undercover, and end portions at vehicle transverse direction inner sides of the rocker moldings, are superposed one on another at least in a vehicle vertical direction.

3 Claims, 11 Drawing Sheets

(51) Int. Cl.
*B60R 13/04* (2006.01)
*B62D 21/03* (2006.01)

(58) Field of Classification Search
USPC ...................................................... 296/180.1
See application file for complete search history.

(56) References Cited

U.S. PATENT DOCUMENTS

| | | |
|---|---|---|
| 2011/0025085 A1 | 2/2011 | Kubo |
| 2013/0026790 A1* | 1/2013 | Kakiuchi ............... B62D 35/02 296/193.07 |
| 2015/0015026 A1* | 1/2015 | Nojima .................. B62D 25/20 296/180.1 |

* cited by examiner

VEHICLE LOWER PORTION STRUCTURE

TECHNICAL FIELD

The present invention relates to a vehicle lower portion structure.

RELATED ART

Japanese Patent Application Laid-Open (JP-A) No. 2010-208408 discloses a structure in which an undercover, that covers the bottom surface side of a vehicle body, and rocker moldings, that are provided at the vehicle transverse direction outer side lower portions of rockers, are fixed to the lower portions of the rockers.

SUMMARY OF INVENTION

Technical Problem

However, in the above-described conventional example, there is a structure in which fixing of the undercover and fixing of the rocker moldings are carried out alternately in the vehicle longitudinal direction, and gaps exist between the undercover and the rocker moldings. This means that regions (exposed regions), that are covered by neither the undercover nor the rocker moldings, exist at portions of the lower portions of the rockers. When small stones or the like hit these exposed regions during traveling, there is the possibility that peeling of paint, or the like, will arise at the rockers. Further, when the undercover and the rocker moldings are made integral and are made into a single cover, this cover is removed and installed entirely at the time of servicing the vehicle, and the removal and installment work is difficult.

In consideration of the above-described circumstances, an object of the present invention is to protect rockers while ensuring the workability of removing and installing an undercover and rocker moldings.

Solution to Problem

A vehicle lower portion structure relating to a first aspect of the present invention comprises: an undercover that is fixed to a lower portion of a vehicle body, and that covers a bottom surface side of the vehicle body; and rocker moldings that are fixed to the lower portion of the vehicle body, and are disposed at vehicle transverse direction outer sides of the undercover, and are provided from vehicle transverse direction outer sides of rockers, that extend in a vehicle longitudinal direction at both sides in a vehicle transverse direction at the lower portion of the vehicle body, to vehicle lower sides, wherein end portions at the vehicle transverse direction outer sides of the undercover, and end portions at vehicle transverse direction inner sides of the rocker moldings, are superposed one on another at least in a vehicle vertical direction.

In this vehicle lower portion structure, the end portions at the vehicle transverse direction outer sides of the undercover, and the end portions at the vehicle transverse direction inner sides of the rocker moldings, are superposed one on another at least in the vehicle vertical direction. Therefore, regions, that are exposed without being covered by either of the undercover or the rocker moldings, do not exist at the rockers. Accordingly, small stones or the like do not hit the rockers during traveling. Further, because the undercover and the rocker moldings are made to be separate bodies, they can respectively be removed and installed independently. Therefore, the rockers can be protected while the workability of removing and installing the undercover and the rocker moldings is ensured.

In a second aspect, in the vehicle lower portion structure relating to the first aspect, among terminal ends at the vehicle transverse direction outer sides of the undercover and terminal ends at the vehicle transverse direction inner sides of the rocker moldings, terminal ends at sides that are exposed to vehicle outer sides are positioned further toward a vehicle upper side than lower ends of the rocker moldings.

In this vehicle lower portion structure, among the end portions at the vehicle transverse direction outer sides of the undercover and the end portions at the vehicle transverse direction inner sides of the rocker moldings, the end portions that are at the sides that are exposed to the vehicle outer sides are hidden by the lower ends of the rocker moldings and are difficult to see from the vehicle sides. Therefore, the appearance is good.

In a third aspect, in the vehicle lower portion structure relating to the first aspect or the second aspect, mounting portions to the vehicle body are provided so as to project-out at one of the end portions at the vehicle transverse direction outer sides of the undercover and the end portions at the vehicle transverse direction inner sides of the rocker moldings, cut-outs in which the mounting portions are placed are formed in another of the end portions at the vehicle transverse direction outer sides of the undercover and the end portions at the vehicle transverse direction inner sides of the rocker moldings, and the vehicle lower portion structure comprises cover members that close off gaps between the mounting portions and the cut-outs.

In this vehicle lower portion structure, one of the end portions at the vehicle transverse direction outer sides of the undercover and the end portions at the vehicle transverse direction inner sides of the rocker moldings are fixed at the mounting portions, and therefore, can be easily removed from and installed to the vehicle body. The mounting portions are placed in cut-outs that are provided at the other of the end portions at the vehicle transverse direction outer sides of the undercover and the end portions at the vehicle transverse direction inner sides of the rocker moldings. Because the gaps between the mounting portions and the cut-outs are filled-in by the cover members, the rockers are not exposed. Further, if the cover members are detached, the mounting portions appear, and therefore, the undercover and the rocker moldings can be removed and installed easily. Thus, the rockers can be protected while the workability of removing and installing the undercover and the rocker moldings is ensured to be good.

In a fourth aspect, in the vehicle lower portion structure relating to the first aspect or the second aspect, mounting portions to the vehicle body are provided so as to project-out at one of the end portions at the vehicle transverse direction outer sides of the undercover and the end portions at the vehicle transverse direction inner sides of the rocker moldings, cut-outs, whose opening surface areas are smaller than surface areas of the mounting portions, are formed in another of the end portions at the vehicle transverse direction outer sides of the undercover and the end portions at the vehicle transverse direction inner sides of the rocker moldings, and the mounting portions are superposed on vehicle inner sides of edge portions of the cut-outs.

In this vehicle lower portion structure, the mounting portions are superposed on the vehicle inner sides of the edge portions of the cut-outs, and the cut-outs are closed-off. Therefore, the rockers are not exposed. Further, because the mounting portions can be seen through the cut-outs, the workability of removal and installment is good. Thus, by a simple structure, the rockers can be protected while the workability of removing and installing the undercover and the rocker moldings is ensured to be good.

In a fifth aspect, in the vehicle lower portion structure relating to the first aspect or the second aspect, mounting portions to the vehicle body are provided so as to project-out at one of the end portions at the vehicle transverse direction outer sides of the undercover and the end portions at the vehicle transverse direction inner sides of the rocker moldings, and movable portions, that can open and close due to hinges that are molded integrally therewith and that, in closed states, are superposed on vehicle outer sides of the mounting portions, are provided at another of the end portions at the vehicle transverse direction outer sides of the undercover and the end portions at the vehicle transverse direction inner sides of the rocker moldings.

In this vehicle lower portion structure, the mounting portions, that are provided at one of the end portions at the vehicle transverse direction outer sides of the undercover and the end portions at the vehicle transverse direction inner sides of the rocker moldings, are hidden by the vehicle inner sides of the movable portions due to the movable portions, that are provided at the other, being closed. Accordingly, exposure of the mounting portions is suppressed, and the appearance can be improved. Further, because the mounting portions appear due to the movable portions being opened, the workability of removal and installment is good. Thus, the rockers are protected while the appearance at usual times is improved, and further, the workability of removing and installing the undercover and the rocker moldings can be ensured.

In a sixth aspect, in the vehicle lower portion structure relating to the fifth aspect, extended portions, that are superposed from vehicle inner sides so as to, when the movable portions are closed, span over the movable portions and non-movable portions that are adjacent to the movable portions, are provided at one of the end portions at the vehicle transverse direction outer sides of the undercover and the end portions at the vehicle transverse direction inner sides of the rocker moldings.

In this vehicle lower portion structure, when the movable portions are closed, the extended portions are superposed from the vehicle inner sides so as to span over the movable portions and the non-movable portions, and therefore, the gaps between the movable portions and the non-movable portions are closed-off. Accordingly, there are very few cases in which mud, water or the like enters-in from these gaps and hits the rockers. Therefore, the rockers can be protected.

In a seventh aspect, in the vehicle lower portion structure relating to the fifth aspect, when the movable portions are closed, portions of the movable portions are superposed, from vehicle outer sides, on non-movable portions that are adjacent to the movable portions.

In this vehicle lower portion structure, when the movable portions are closed, portions of the movable portions are superposed, from the vehicle outer sides, on the non-movable portions, and therefore, gaps are not formed between the movable portions and the non-movable portions. Accordingly, there are very few cases in which mud, water or the like enters-in from between the movable portions and the non-movable portions and hits the rockers. Therefore, the rockers can be protected by a simple structure.

Advantageous Effects of Invention

As described above, in accordance with the vehicle lower portion structure relating to the first aspect, the excellent effect is obtained that the rockers can be protected while the workability of removing and installing the undercover and the rocker moldings is ensured.

In accordance with the vehicle lower portion structure relating to the second aspect, the excellent effect is obtained that the appearance is good.

In accordance with the vehicle lower portion structure relating to the third aspect, the excellent effect is obtained that the rockers can be protected while the workability of removing and installing the undercover and the rocker moldings is ensured to be good.

In accordance with the vehicle lower portion structure relating to the fourth aspect, the excellent effect is obtained that, by a simple structure, the rockers can be protected while the workability of removing and installing the undercover and the rocker moldings is ensured to be good.

In accordance with the vehicle lower portion structure relating to the fifth aspect, the excellent effects are obtained that the rockers are protected while the appearance at usual times is improved, and further, the workability of removing and installing the undercover and the rocker moldings can be ensured.

In accordance with the vehicle lower portion structure relating to the sixth aspect, the excellent effect is obtained that the rockers can be protected.

In accordance with the vehicle lower portion structure relating to the seventh aspect, the excellent effect is obtained that the rockers can be protected by a simple structure.

BRIEF DESCRIPTION OF THE DRAWINGS

FIG. 2 is a cross-sectional view showing a vehicle lower portion structure.

FIG. 3 is an exploded perspective view showing the vehicle lower portion structure.

FIG. 4 is a perspective view showing a state in which a cover member is mounted.

FIG. 6 is a cross-sectional view showing a vehicle lower portion structure.

FIG. 7 is a perspective view showing a state in which a movable portion is closed.

FIG. 8 is a perspective view showing a state in which the movable portion is open.

FIG. 9 is a perspective view showing a state in which the movable portion is open, in a vehicle lower portion structure relating to modified example 1.

FIG. 10 is a perspective view showing a state in which the movable portion is closed, in a vehicle lower portion structure relating to modified example 2.

FIG. 11 is a perspective view showing a state in which the movable portion is open, in the vehicle lower portion structure relating to modified example 2.

DESCRIPTION OF EMBODIMENTS

Forms for embodying the present invention are described hereinafter on the basis of the drawings.

First Embodiment

Figure 1:
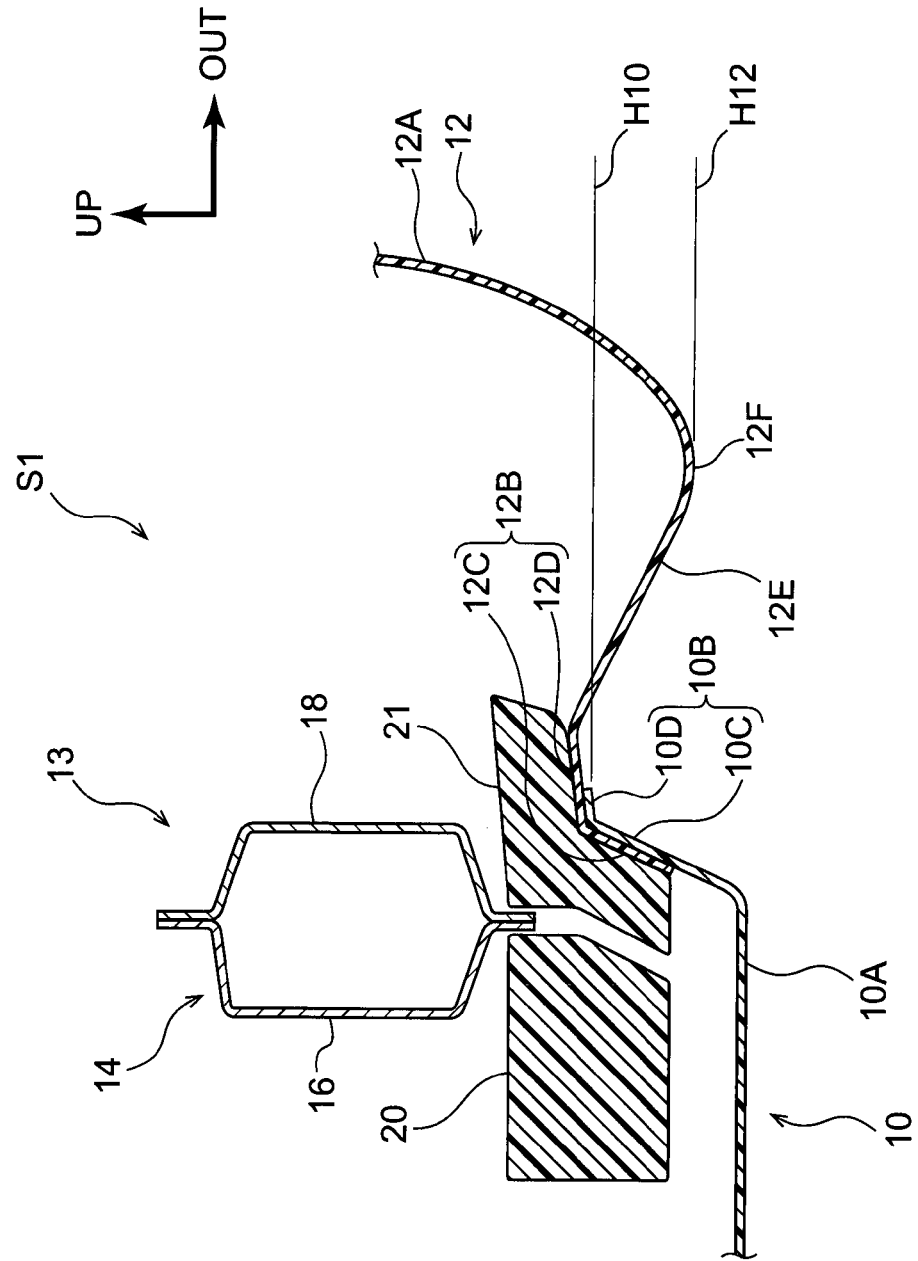
FIG. 1 is a cross-sectional view showing a vehicle lower portion structure relating to a first embodiment.

In FIG. 1, a vehicle lower portion structure S1 relating to the present embodiment has an undercover 10 and rocker moldings 12.

The undercover 10 is a member that is fixed to the lower portion of a vehicle body 13, and covers the bottom surface side of the vehicle body 13, and is formed of resin for example. Rockers 14 extend in the vehicle longitudinal direction at both sides in the vehicle transverse direction at the lower portion of the vehicle body 13. Each of the rockers 14 is structured by an inner panel 16 and an outer panel 18, that are structured in hat-shapes in cross-section for example, being joined together in the vehicle transverse direction, and has a closed cross-sectional structure. Impact absorbing materials 20, 21 are provided at the vehicle lower sides of the rockers 14. The undercover 10 is fixed by using fastening members 22 to, for example, the impact absorbing materials 21 that are positioned at the vehicle transverse direction outer sides. Screws (see FIG. 2), clips, or the like (not illustrated) can be used as the fastening members 22. The undercover 10 has a general portion 10A that extends substantially horizontally, and end portions 10B at the vehicle transverse direction outer sides. The end portion 10B has a vertical wall portion 10C that extends substantially toward the vehicle upper side from the vehicle transverse direction outer side end of the general portion 10A, and an edge portion 10D that is the terminal end that juts-out substantially toward the vehicle transverse direction outer side from the upper end of this vertical wall portion 10C.

The rocker moldings 12 are members that are fixed to the lower portion of the vehicle body 13, and are disposed at the vehicle transverse direction outer sides of the undercover 10, and are provided from the vehicle transverse direction outer sides of the rockers 14 to the vehicle lower sides, and are formed of resin for example. The rocker molding 12 has a general portion 12A, a bottom surface portion 12E, and an end portion 12B at the vehicle transverse direction inner side, and covers the lower portion at the vehicle transverse direction outer side of the rocker 14 for example. The general portion 12A structures the design surface of the vehicle transverse direction outer side. The bottom surface portion 12E is continuous with the general portion 12A, and is positioned at the bottom surface side of the vehicle body. The border between the general portion 12A and the bottom surface portion 12E is a lower end 12F of the rocker molding 12. The bottom surface portion 12E is inclined toward the vehicle upper side with respect to the horizontal direction, while heading toward the vehicle transverse direction inner side.

The end portion 12B at the vehicle transverse direction inner side has a ceiling portion 12D and a vertical wall portion 12C. The ceiling portion 12D is superposed on the vehicle upper side of the edge portion 10D of the undercover 10. The vertical wall portion 12C extends substantially toward the vehicle lower side from the vehicle transverse direction inner side end of the ceiling portion 12D, and is superposed on the vehicle transverse direction inner side of the vertical wall portion 10C of the undercover 10. Namely, the end portion 10B at the vehicle transverse direction outer side of the undercover 10, and the end portion 12B at the vehicle transverse direction inner side of the rocker molding 12, are superposed one on another in the vehicle vertical direction and the vehicle transverse direction. The undercover 10 and the rocker molding 12 are fixed to the impact absorbing material 21 for example, at the vertical wall portions 10C, 12C.

Among the terminal end at the vehicle transverse direction outer side of the undercover 10 and the terminal end at the vehicle transverse direction inner side of the rocker molding 12, the terminal end at the side that is exposed to the vehicle outer side is positioned further toward the vehicle upper side than the lower end 12F of the rocker molding 12. In the present embodiment, the terminal end of the undercover 10 is exposed to the vehicle outer side, and this terminal end is the terminal end of the edge portion 10D. This terminal end is positioned further toward the vehicle upper side than the lower end 12F of the rocker molding 12. In other words, height H10 of the terminal end of the edge portion 10D is higher than height H12 of the lower end 12F of the rocker molding 12.

Note that the superposing of the end portion 10B at the vehicle transverse direction outer side of the undercover 10 and the end portion 12B at the vehicle transverse direction inner side of the rocker molding 12 may be only in the vehicle vertical direction.

(Operation)

The present embodiment is structured as described above, and the operation thereof is described hereinafter. In FIG. 1, at the vehicle lower portion structure S1 relating to the present embodiment, the end portion 10B at the vehicle transverse direction outer side of the undercover 10, and the end portion 12B at the vehicle transverse direction inner side of the rocker molding 12, are superposed one on the other. Accordingly, a region that is exposed without being covered by either of the undercover 10 or the rocker molding 12 does not exist at the rocker 14. Due thereto, small stones, mud, water, snow melting agents, and the like (unillustrated) do not hit the rockers 14 during traveling. Further, because the undercover 10 and the rocker moldings 12 are made to be separate bodies, they can respectively be removed and installed independently. Therefore, the rockers 14 can be protected while the workability of removing and installing the undercover 10 and the rocker moldings 12 is ensured.

Further, among the end portion 10B at the vehicle transverse direction outer side of the undercover 10 and the end portion 12B at the vehicle transverse direction inner side of the rocker molding 12, the end portion at the side that is exposed to the vehicle outer side, and concretely, the terminal end of the edge portion 10D of the undercover 10, is hidden by the lower end 12F of the rocker molding 12 and is difficult to see from the vehicle side. Therefore, the appearance is good.

Second Embodiment

Figure 2:
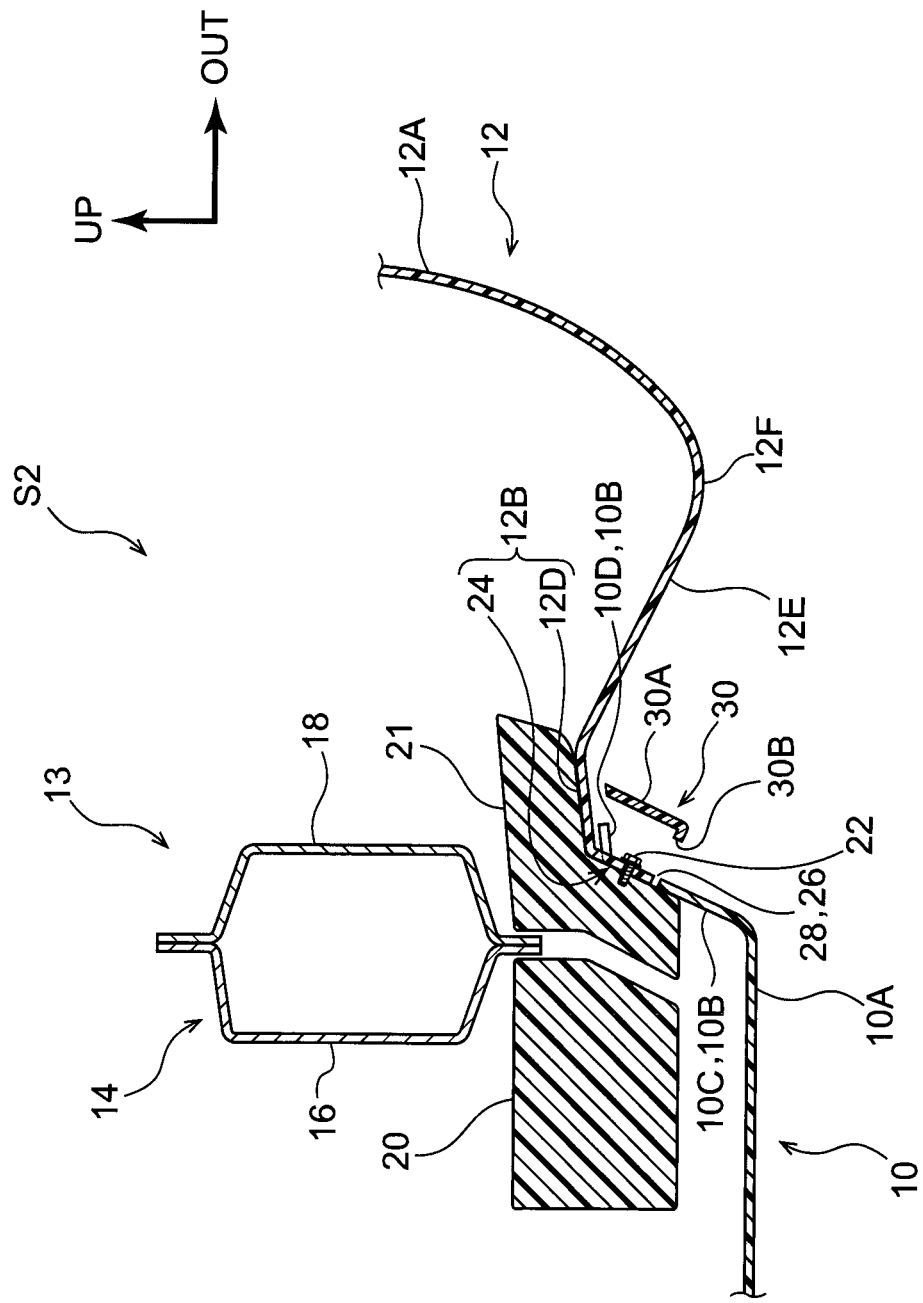
FIG. 2 through FIG. 4 relate to a second embodiment.
Figure 3:
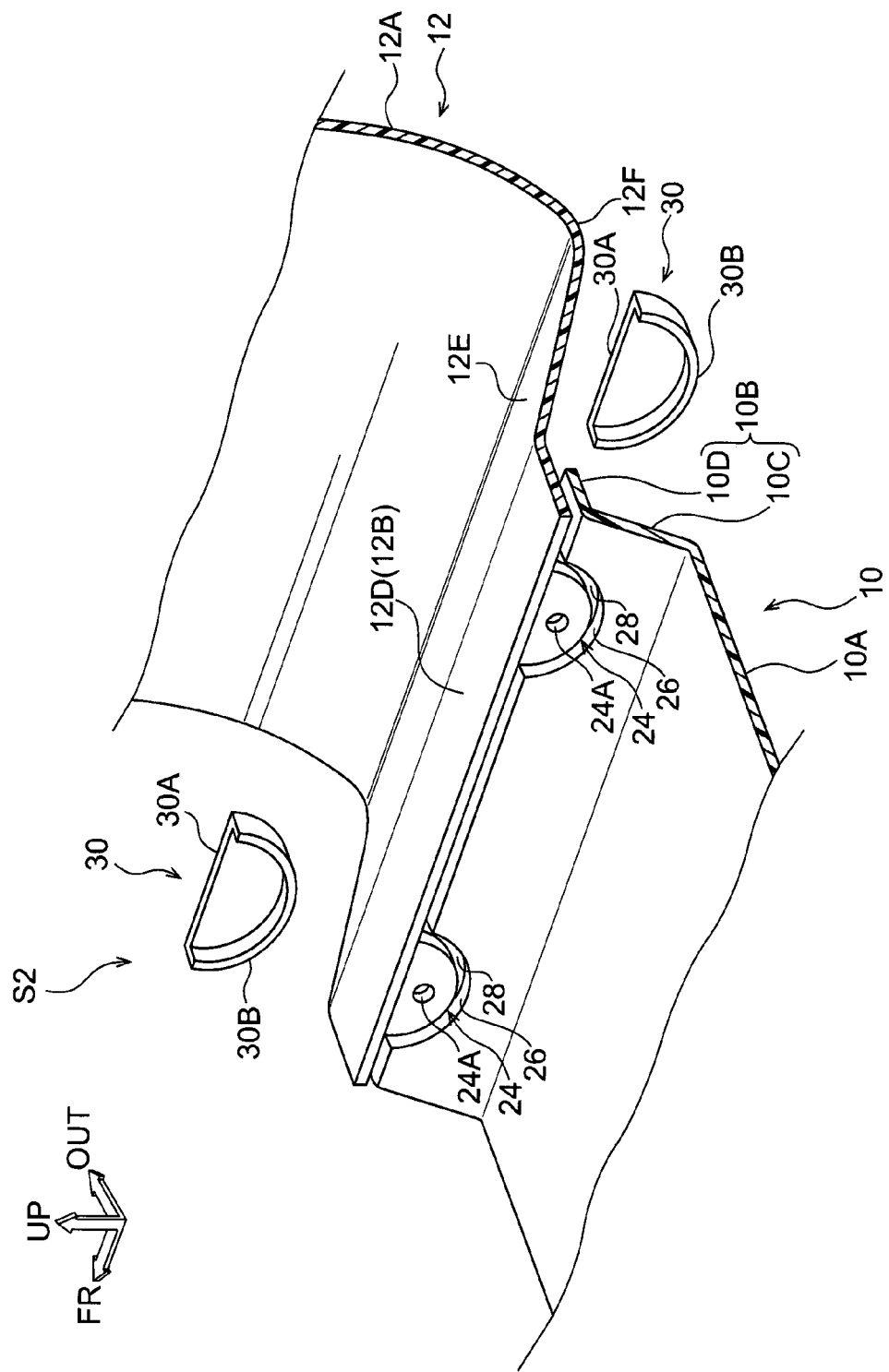

In FIG. 2 and FIG. 3, at a vehicle lower portion structure S2 relating to the present embodiment, mounting portions 24 to the vehicle body 13 are provided so as to project-out at the end portion 12B at the vehicle transverse direction inner side of the rocker molding 12. These mounting portions 24 are formed so as to project-out toward the vehicle lower side in substantially semicircular shapes from the end edge of the ceiling portion 12D. Through-holes 24A for passage of the fastening members 22 are formed in the mounting portions 24. The rocker molding 12 is mounted to the vehicle body 13 by passing the fastening members 22 through the through-holes 24A and fastening the fastening members 22 to the impact absorbing material 21 for example.

The vertical wall portion 12C (see FIG. 1) of the first embodiment is not provided at the rocker molding 12. This is in order to suppress catching of the rocker molding 12 on the undercover 10 and to facilitate removal and installment of the rocker molding 12. Accordingly, in the present embodiment, the edge portion 10D of the undercover 10 is superposed with the vehicle lower side of the ceiling portion 12D of the rocker molding 12, and the rocker molding 12 and the undercover 10 are superposed in the vehicle vertical direction.

As shown in FIG. 3, cut-outs 26 into which the mounting portions 24 are placed are formed in the end portion 10B (the vertical wall portion 10C and the edge portion 10D) at the vehicle transverse direction outer side of the undercover 10. The cut-outs 26 are formed in substantially semicircular shapes that are one size larger, in correspondence with the shapes of the mounting portions 24. As shown in FIG. 3, due to the mounting portions 24 being disposed at the portions of the cut-outs 26, the mounting portions 24 are substantially flush with the vertical wall portion 10C of the undercover 10. Because the cut-outs 26 are one size larger than the mounting portions 24, gaps 28 that are substantially arc shaped are formed between the mounting portions 24 and the cut-outs 26.

The vehicle lower portion structure S2 relating to the present embodiment has cover members 30 that close off the gaps 28. The cover member 30 has a general portion 30A and a convex portion 30B. The general portion 30A is a flat plate portion that is formed in a substantially semicircular shape that is similar to the mounting portion 24. The convex portion 30B is formed along the arc-shaped end edge of the general portion 30A, and has a dimension that fits-together with the gap 28.

Note that the mounting portions 24 may be provided at the end portion 10B at the vehicle transverse direction outer side of the undercover 10. The cut-outs 26 in which these mounting portions 24 are placed are provided (not shown) in the end portion 12B at the vehicle transverse direction inner side of the rocker molding 12. Further, the shapes of the mounting portions 24 and the cut-outs 26 is not limited to substantially semicircular, and may be quadrangular or the like.

The cover members 30 may be structured so as to be engaged with the undercover 10 and the rocker molding 12 at the time of being mounted to the undercover 10 and the rocker molding 12, in order to prevent the cover members 30 from falling-off.

Because the other portions are similar to the first embodiment, the same portions are denoted by the same reference numerals in the drawings, and description thereof is omitted.

(Operation)

Figure 4:
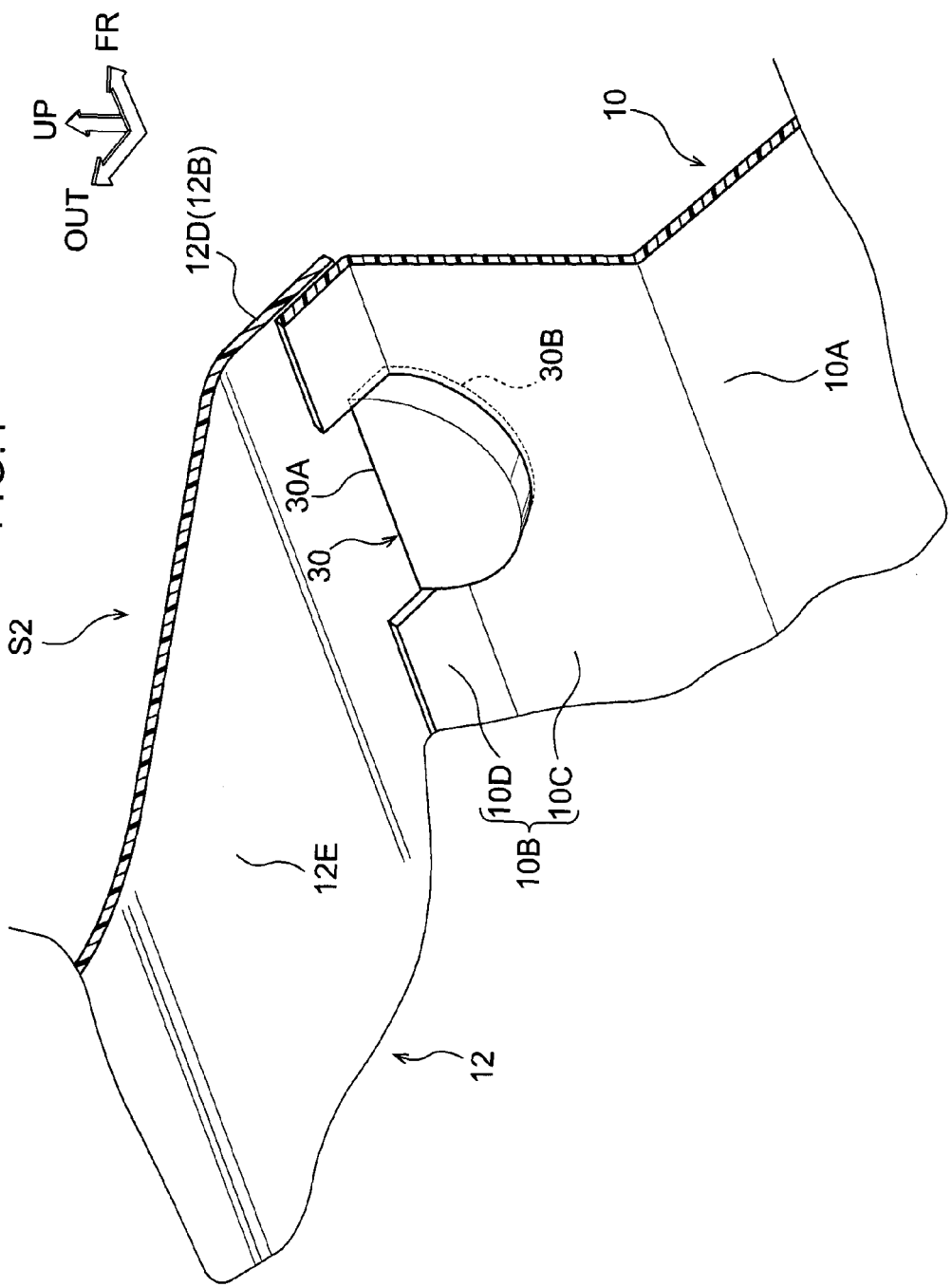

The present embodiment is structured as described above, and the operation thereof is described hereinafter. In FIG. 2 and FIG. 3, at the vehicle lower portion structure S2 relating to the present embodiment, the end portion 12B at the vehicle transverse direction inner side of the rocker molding 12 is fastened to the impact absorbing material 21 at the mounting portions 24 by using the fastening members 22. The mounting portions 24 are placed in the cut-outs 26 that are provided in the end portion 10B at the vehicle transverse direction outer side of the undercover 10. Because the gaps 28 between the mounting portions 24 and the cut-outs 26 are filled-in by the cover members 30, the rocker 14 is not exposed (see FIG. 4). Further, because the fastening members 22 and the mounting portions 24 are covered and hidden by the cover members 30, the appearance is good.

The mounting portions 24 appear when the cover members 30 are detached, and therefore, by removing the fastening members 22, removal and installment of the undercover 10 becomes possible. Because the mounting portions 24 are positioned within the cut-outs 26, there is little interference with the undercover 10 in the direction of removing and installing the undercover 10. Therefore, the rockers 14 can be protected while the workability of removing and installing the undercover 10 and the rocker moldings 12 is ensured to be good.

Third Embodiment

Figure 5:
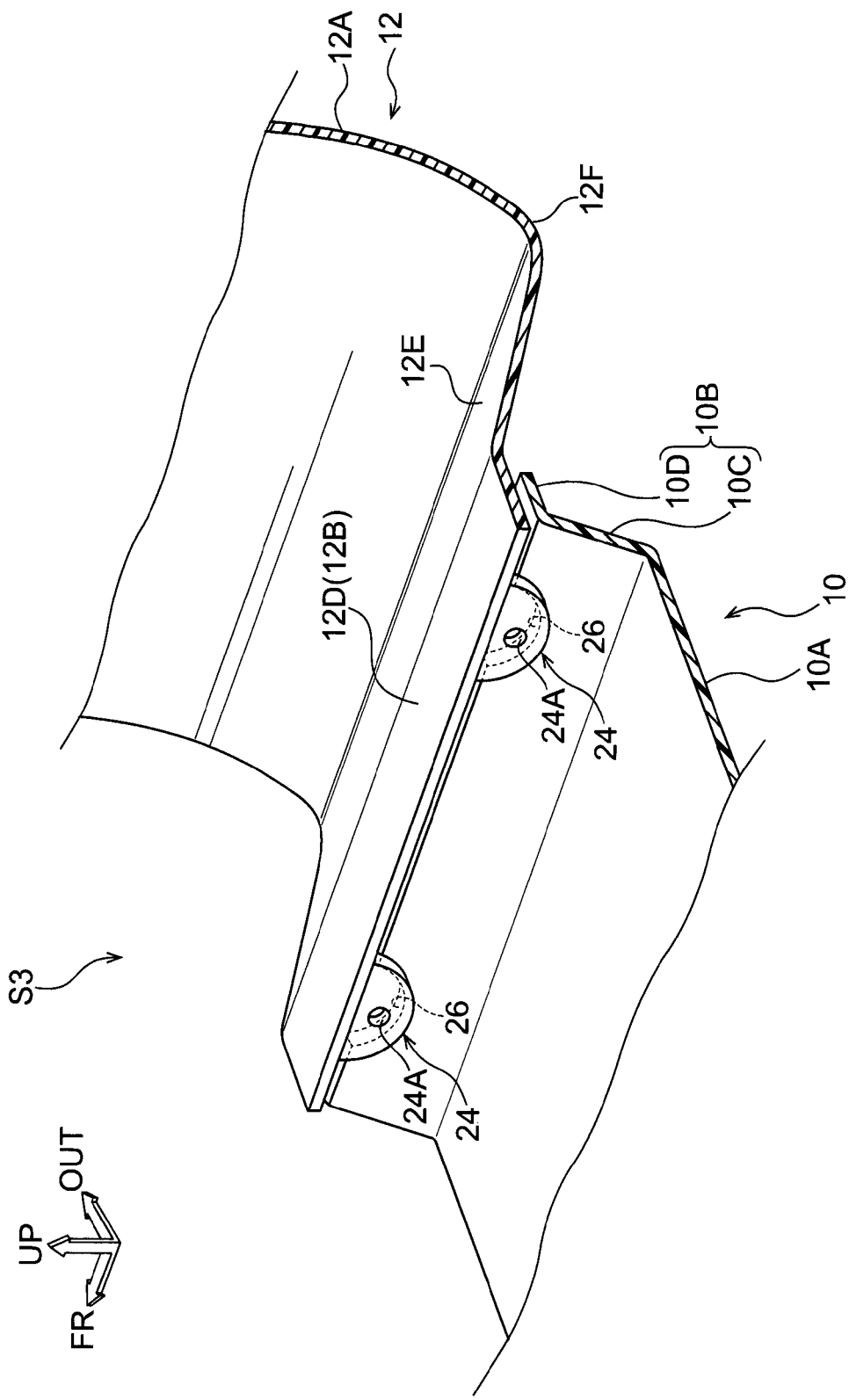
FIG. 5 is a perspective view showing a vehicle lower portion structure relating to a third embodiment.

In FIG. 5, at a vehicle lower portion structure S3 relating to the present embodiment, the mounting portions 24 to the vehicle body 13 (see FIG. 2) are provided so as to project-out at the end portion 12B at the vehicle transverse direction inner side of the rocker molding 12. The structure of the mounting portions 24 and the fastening of the mounting portions 24 to the impact absorbing material 21 by the fastening members 22 are similar to those of the mounting portions 24 in the second embodiment.

The cut-outs 26, whose opening surface areas are smaller than the surface areas of the mounting portions 24, are formed in the end portion 10B at the vehicle transverse direction outer side of the undercover 10. The cut-outs 26 in the second embodiment (FIG. 3) are one size larger than the mounting portions 24, whereas the cut-outs 26 relating to the present embodiment are formed to be one size smaller than the mounting portions 24. These mounting portions 24 are superposed on the vehicle inner sides of the edge portions of the cut-outs 26. The shape of the cut-outs 26 is set such that at least the head portions of the fastening members 22 (see FIG. 2) pass-through.

The number of the mounting portions 24 is not limited to one place, and may be two or more places. Further, the shape of the cut-outs 26 may be different than the shape of the mounting portions 24.

Because the other portions are similar to the first embodiment or the second embodiment, the same portions are denoted by the same reference numerals in the drawings, and description thereof is omitted.

(Operation)

The present embodiment is structured as described above, and the operation thereof is described hereinafter. In FIG. 5, at the vehicle lower portion structure S3 relating to the present embodiment, the mounting portions 24 are superposed on the vehicle inner sides of the edge portions of the cut-outs 26, and these cut-outs 26 are closed-off. Therefore, the rocker 14 is not exposed. Even in the state in which the undercover 10 is mounted, removal and installment of the rocker molding 12 is possible by elastically deforming the end portion 10B of the undercover 10.

Further, the mounting portions 24 can be seen through the cut-outs 26, and further, fastening and removal and installment of the fastening members 22 are possible, and therefore, the workability of removal and installment is good. Therefore, by a simple structure, the rockers 14 can be protected while the workability of removing and installing the undercover 10 and the rocker moldings 12 is ensured to be good.

Fourth Embodiment

Figure 6:
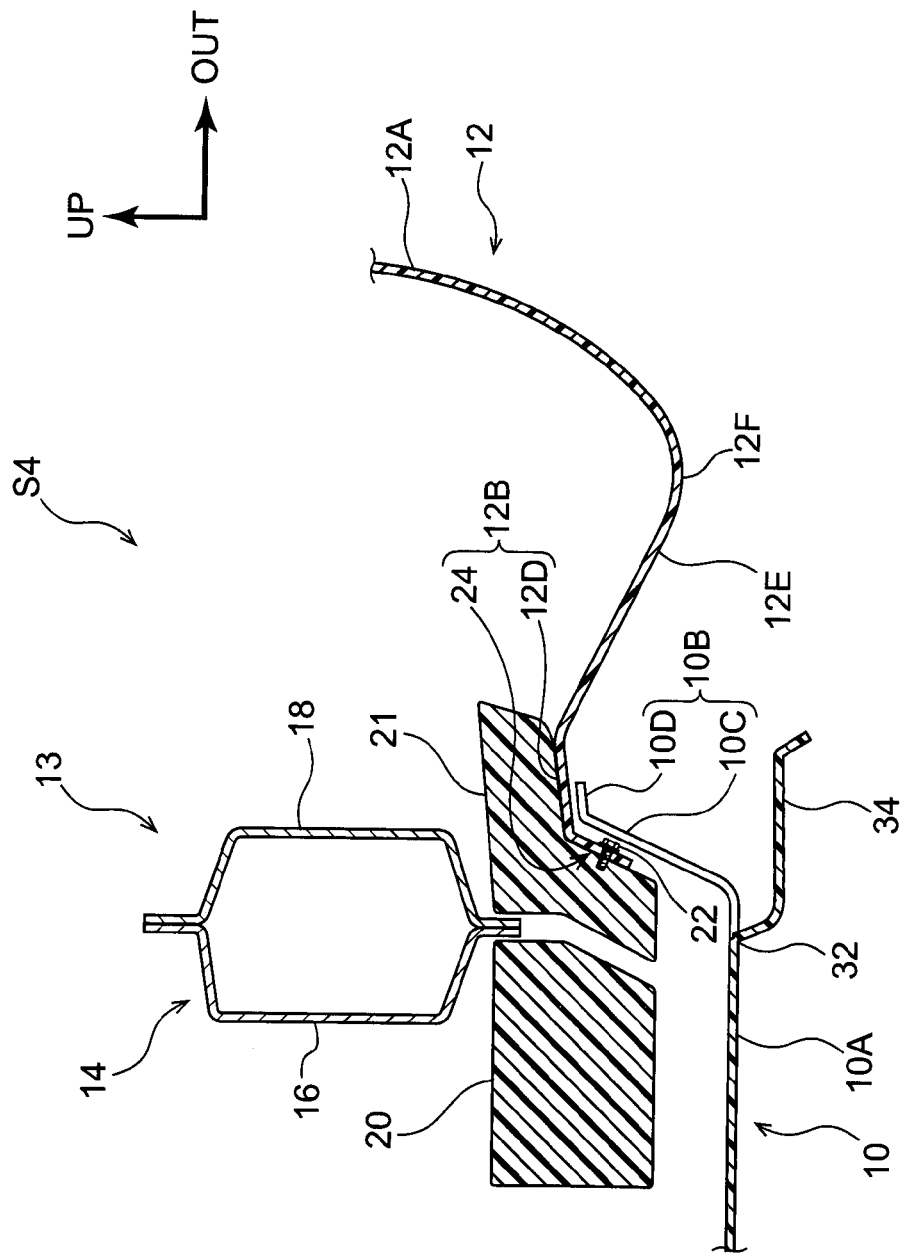
FIG. 6 through FIG. 11 relate to a fourth embodiment.
Figure 7:
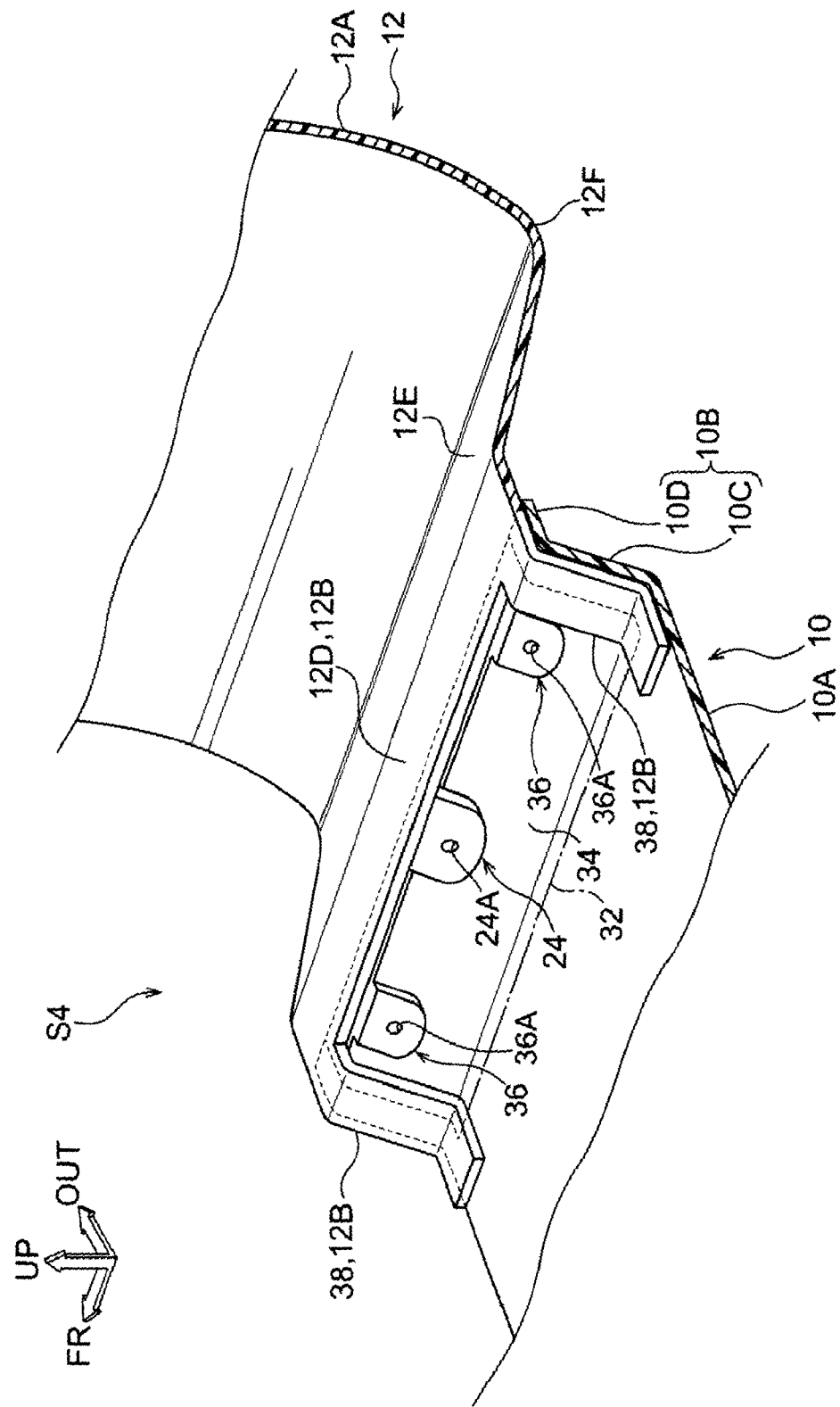
Figure 8:
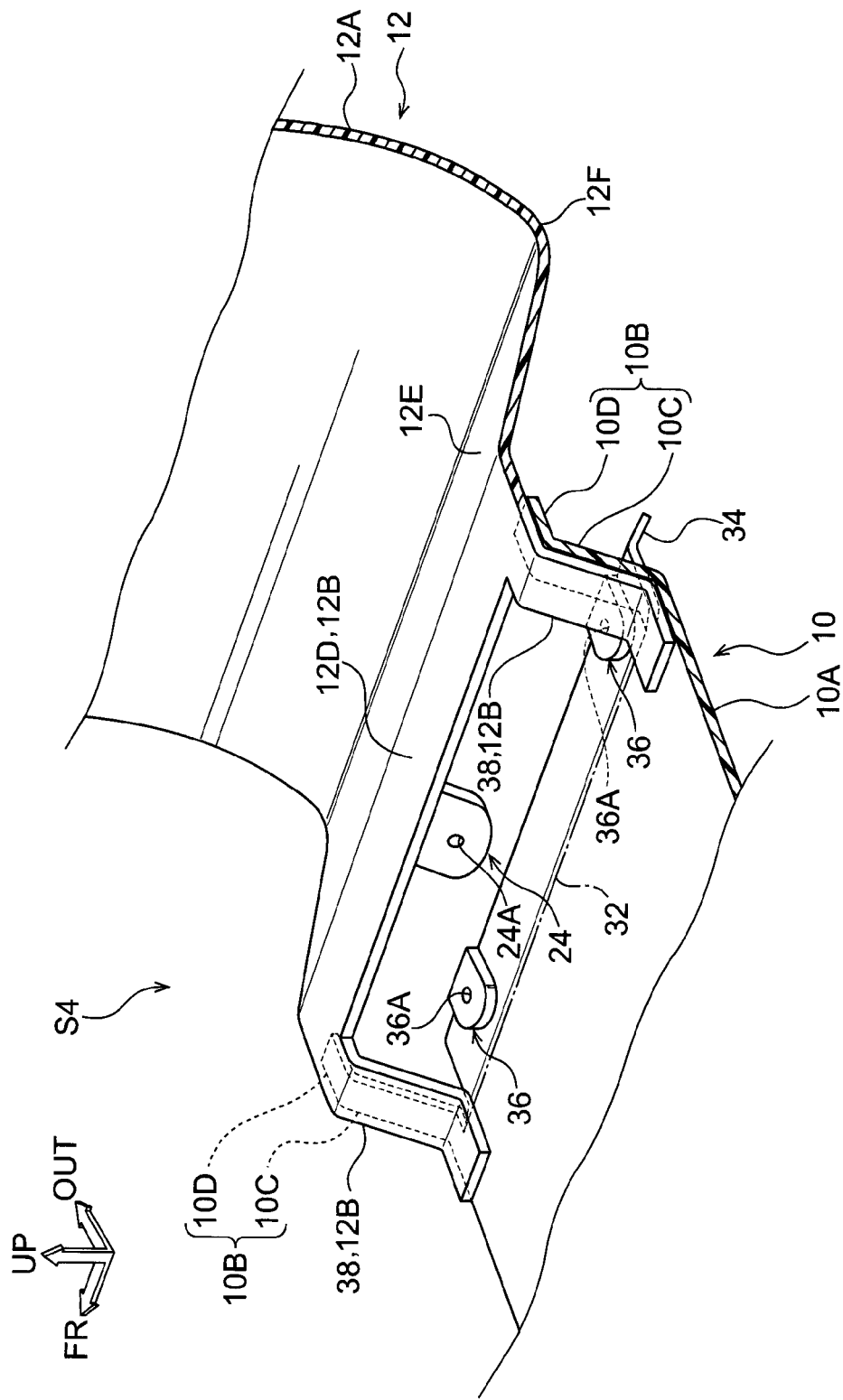

From FIG. 6 to FIG. 8, in a vehicle lower portion structure S4 relating to the present embodiment, the mounting portion 24 to the vehicle body 13 is provided so as to project-out at the end portion 12B at the vehicle transverse direction inner side of the rocker molding 12. The structure of the mounting portion 24 and the fastening of the mounting portion 24 to the impact absorbing material 21 by the fastening member 22 are similar to those of the mounting portions 24 in the second embodiment.

A movable portion 34, that can open and close by a hinge 32 that is molded integrally therewith and that, in a closed state, is superposed on the vehicle outer side of the mounting portion 24, is provided at the end portion 10B at the vehicle transverse direction outer side of the undercover 10. This movable portion 34 can open and close mainly a portion of the end portion 10B. In consideration of the appearance from the vehicle side, the hinge 32 is provided, for example, at the general portion 10A of the undercover 10, and extends in the vehicle longitudinal direction. Therefore, the movable portion 34 includes a portion of the general portion 10A. Note that the hinge 32 may be provided at the vertical wall portion 10C of the undercover 10.

Mounting portions 36 of the undercover 10 to the impact absorbing material 21 (the vehicle body 13) are provided at the movable portion 34. The mounting portions 36 are formed to be thick partially, or are concave as seen from the vehicle outer side, and through-holes 36A for the passage of fastening members (not illustrated) that serve as fixing members are formed in the mounting portions 36. Further, the mounting portions 36 are disposed so as to be lined-up with the mounting portion 24 in the vehicle longitudinal direction, in the state in which the movable portion 34 is closed. The mounting portion 24 is provided at the vehicle inner side of the movable portion 34 that is in the closed state.

Extended portions 38 are provided at the end portion 12B at the vehicle transverse direction inner side of the rocker molding 12. The extended portions 38 are regions that are superposed, from the vehicle inner side, so as to span over the movable portion 34 that is in the closed state and non-movable portions (the general portion 10A, the vertical wall portion 10C and the edge portion 10D) that are adjacent to the movable portion 34. The gaps between the movable portion 34 that is in the closed state and the non-movable portions are closed-off by these extended portions 38.

Note that the mounting portion 24 and the extended portions 38 may be provided at the end portion 10B at the vehicle transverse direction outer side of the undercover 10. In this case, the hinge 32 and the movable portion 34 are provided at the end portion 12B at the vehicle transverse direction inner side of the rocker molding 12. The number of and the positions of the mounting portions 36 at the movable portion 34 are not limited to those that are illustrated and can be changed appropriately.

Because the other portions are similar to the first embodiment, the second embodiment or the third embodiment, the same portions are denoted by the same reference numerals in the drawings, and description thereof is omitted.

(Operation)

The present embodiment is structured as described above, and the operation thereof is described hereinafter. In FIG. 6 and FIG. 7, at the vehicle lower portion structure S4 relating to the present embodiment, by closing the movable portion 34 that is provided at the end portion 10B at the vehicle transverse direction outer side of the undercover 10, the mounting portion 24, that is provided at the end portion 12B at the vehicle transverse direction inner side of the rocker molding 12, is hidden at the vehicle inner side of the movable portion 34. Accordingly, exposure of the mounting portion 24 is suppressed, and the appearance can be improved. Further, at this time, the gaps between the movable portion 34 that is in the closed state and the non-movable portions are closed-off by the extended portions 38, and therefore, there are very few cases of mud, water or the like entering-in from these gaps and hitting the rocker 14. Therefore, the rocker 14 can be protected. The movable portion 34 can be fastened to the impact absorbing material 21 for example, by passing fastening members (not illustrated) through the through-holes 36A of the mounting portions 36. The mounting portions 36 of the movable portion 34 also serve as portions for mounting the undercover 10 to the vehicle body 13, but mounting portions may be added at other regions.

Further, as shown in FIG. 8, by opening the movable portion 34, the mounting portion 24 appears, and therefore, the workability of removing and installing the rocker molding 12 is good. Thus, the rockers 14 are protected while the appearance at usual times is improved, and further, the workability of removing and installing the undercover 10 and the rocker moldings 12 can be ensured.

Modified Example 1

Figure 9:
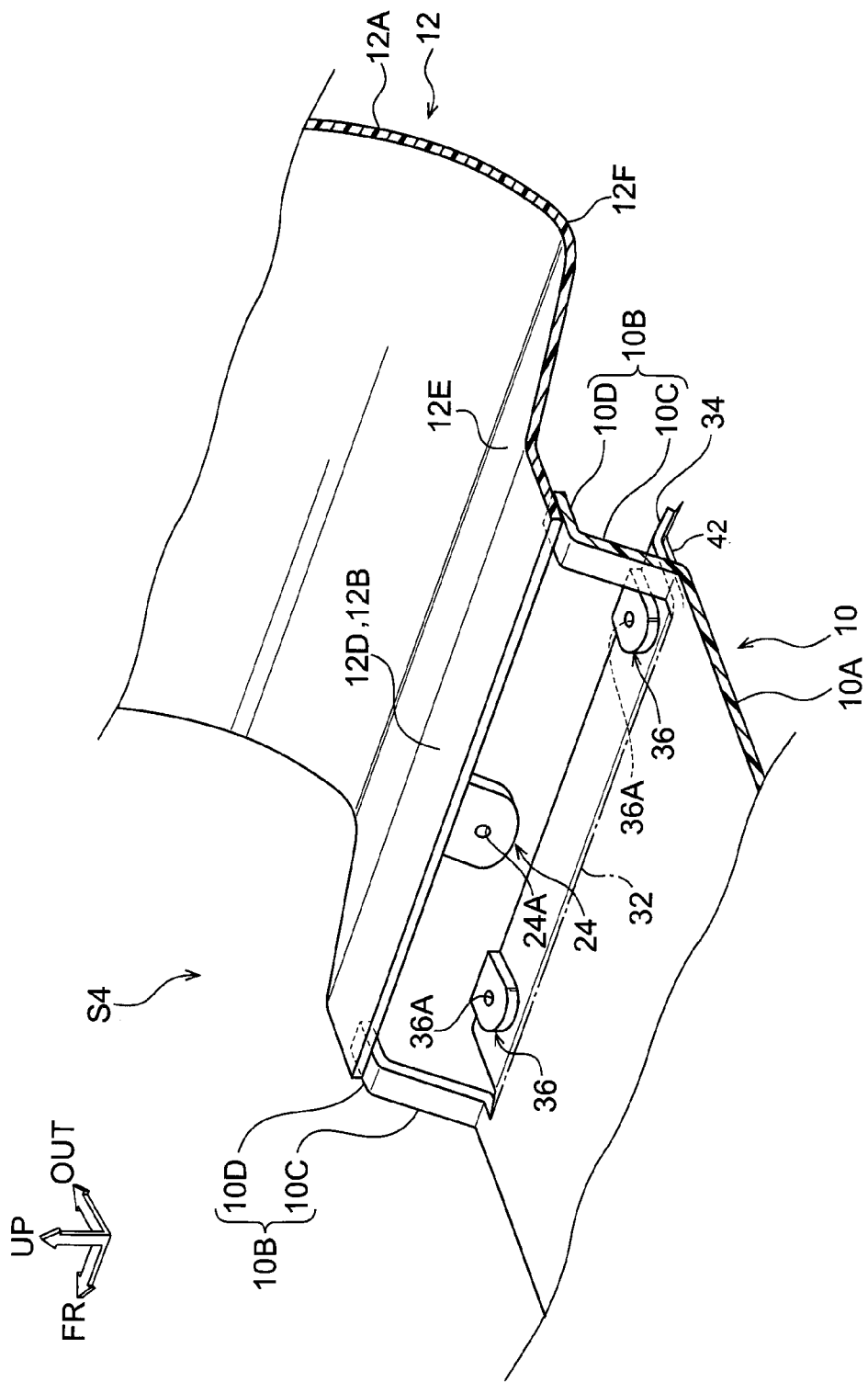

In modified example 1 that is shown in FIG. 9, when the movable portion 34 is closed, portions of the movable portion 34 are superposed, from the vehicle outer side, on the non-movable portions (the general portion 10A, the vertical wall portion 10C and the edge portion 10D) that are adjacent to the movable portion 34. Concretely, flanges 42 are provided at both ends in the vehicle longitudinal direction of the movable portion 34. Due to the flanges 42 being superposed on the non-movable portions, gaps are not formed between the movable portion 34 that is in the closed state and the non-movable portions. Accordingly, there are very few cases in which mud, water or the like enter-in from these gaps and hits the rocker 14. Therefore, the rocker 14 can be protected by a simple structure.

Modified Example 2

Figure 10:
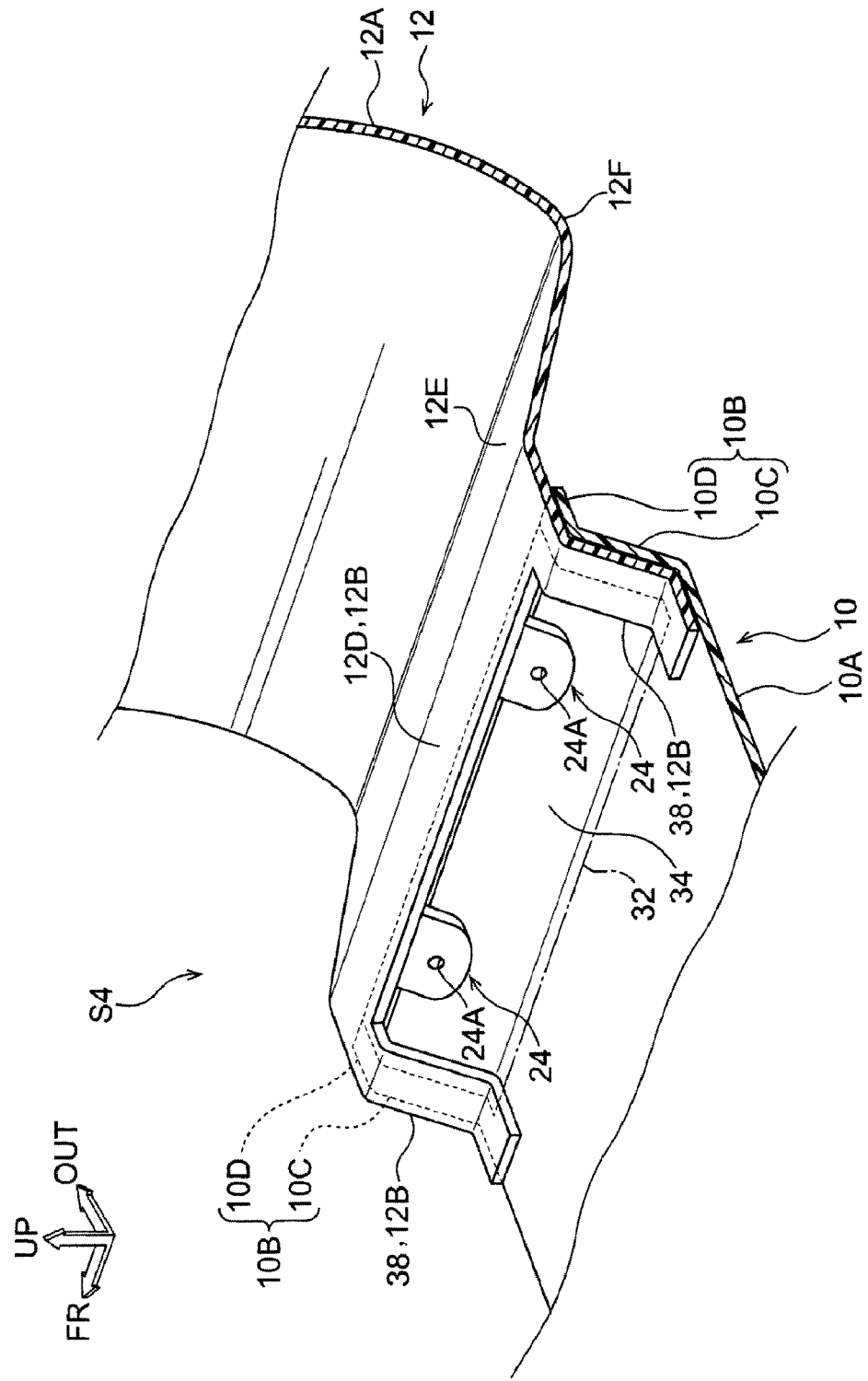
Figure 11:
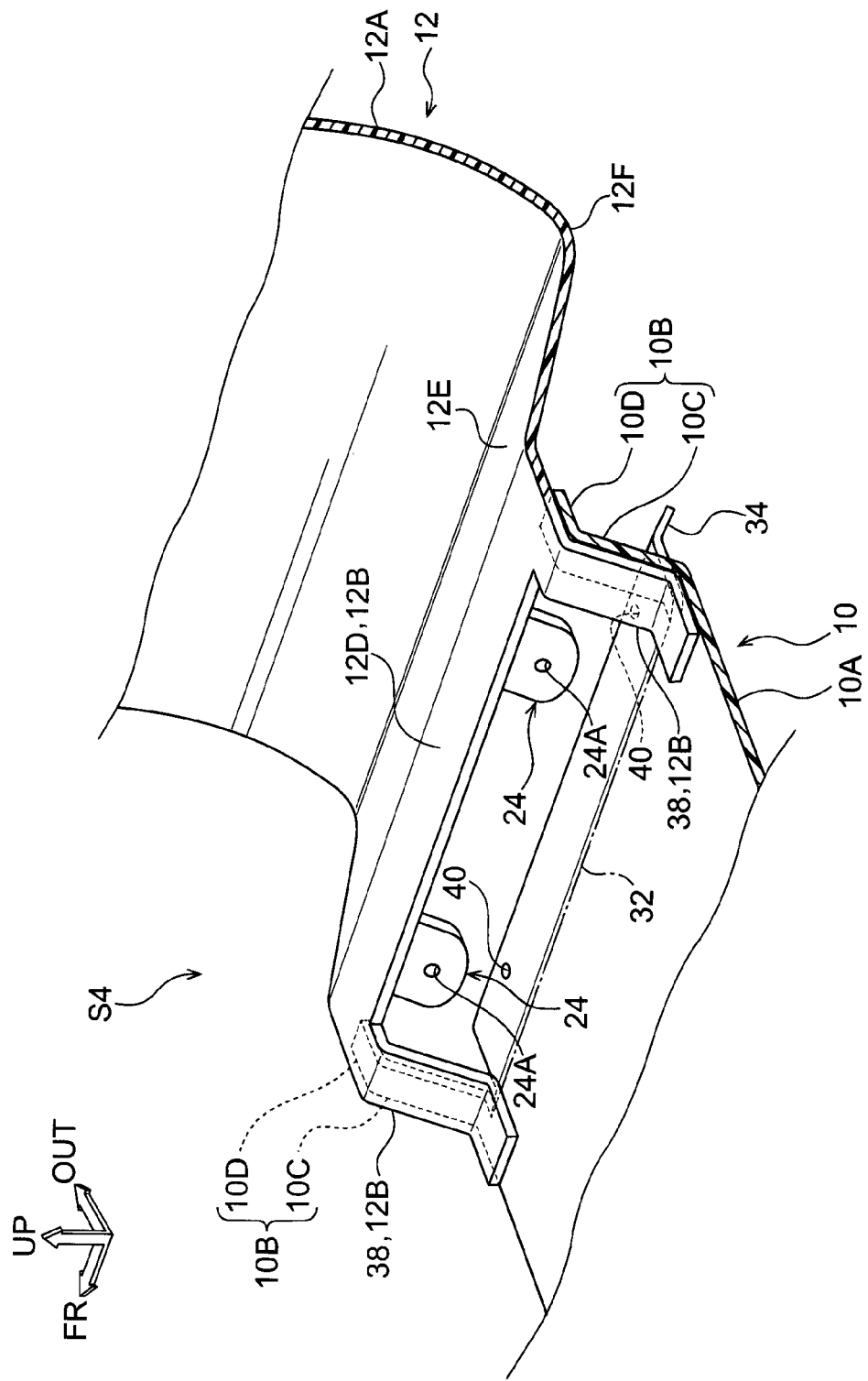

In modified example 2 that is shown in FIG. 10 and FIG. 11, the plural mounting portions 24 are provided at the rocker molding 12, and the through-holes 36A, that respectively coincide with the through-holes 24A of the mounting portions 24 in the state in which the movable portion 34 is closed, are provided in the movable portion 34. Due to the fastening members 22 being passed-through the through-holes 24A, 36A and being fastened to the impact absorbing material 21 (see FIG. 6), the movable portion 34 and the mounting portions 24 are fastened together. Namely, because the undercover 10 and the rocker molding 12 are fastened at the same places, the workability of removal and installment is good.

As shown in FIG. 11, when the fastening members 22 (see FIG. 6) are removed and the movable portion 34 is opened, the undercover 10 and the rocker molding 12 can respectively be removed and installed independently. In the state in which the undercover 10 is mounted, the extended portions 38 of the rocker molding 12 and the undercover 10 are superposed one on another, but, by elastically deforming these superposed portions, removal and installment of the rocker molding 12 is possible.

Note that the extended portions 38 (FIG. 6 through FIG. 8) and the flanges 42 (FIG. 9) do not have to be provided, provided that the sealability between the movable portion 34 that is in the closed state and the non-movable portions is ensured.

Other Embodiments

In the above-described respective embodiments, the impact absorbing materials 20, 21 are provided at the vehicle lower sides of the rockers 14, but there may be a structure in which these impact absorbing materials 20, 21 are not provided. In a case in which the impact absorbing materials 20, 21 are not provided, the fastening members 22 (fixing members) are fastened to the rockers 14 for example.

Further, there may be a structure in which the undercover 10 and the rocker moldings 12 are mounted to the floor, the frame, cross members, or the like of the vehicle body 13.

Although there is a structure in which the end portions 12B of the rocker moldings 12 are covered by the end portions 10B of the undercover 10, conversely, there may be a structure in which the end portions 10B of the undercover 10 are covered by the end portions 12B of the rocker moldings 12.

Although examples of embodiments of the present invention have been described above, the embodiments of the present invention are not limited to the above, and, of course, can be implemented by being modified in various ways other than the above within a scope that does not depart from the gist thereof.

The disclosure of Japanese Patent Application No. 2013-239165 filed on Nov. 19, 2013 is, in its entirety, incorporated by reference into the present Description. All publications, patent applications, and technical standards mentioned in the present Description are incorporated by reference into the present Description to the same extent as if such individual publication, patent application, or technical standard was specifically and individually indicated to be incorporated by reference.

EXPLANATION OF REFERENCE NUMERALS

10 undercover
10B end portion
12 rocker molding
12B end portion
12F lower end
13 vehicle body
14 rocker
24 mounting portion
28 gap
30 cover member
32 hinge
34 movable portion
38 extended portion
42 flange (a portion of the movable portion)
S1 vehicle lower portion structure
S2 vehicle lower portion structure
S3 vehicle lower portion structure
S4 vehicle lower portion structure

The invention claimed is:

1. A vehicle lower portion structure comprising:
an undercover that is fixed to a lower portion of a vehicle body, and that covers a bottom surface side of the vehicle body; and
rocker moldings that are fixed to the lower portion of the vehicle body, and are disposed at vehicle transverse direction outer sides of the undercover, and are provided from vehicle transverse direction outer sides of rockers, that extend in a vehicle longitudinal direction at both sides in a vehicle transverse direction at the lower portion of the vehicle body, to vehicle lower sides,
wherein
end portions at the vehicle transverse direction outer sides of the undercover, and end portions at vehicle transverse direction inner sides of the rocker moldings, are superposed one on another at least in a vehicle vertical direction,
mounting portions to the vehicle body are provided so as to project-out at one of the end portions at the vehicle transverse direction outer sides of the undercover and the end portions at the vehicle transverse direction inner sides of the rocker moldings,
cut-outs in which the mounting portions are placed are formed in another of the end portions at the vehicle transverse direction outer sides of the undercover and the end portions at the vehicle transverse direction inner sides of the rocker moldings, and
the vehicle lower portion structure comprises cover members that close off gaps between the mounting portions and the cut-outs.

2. A vehicle lower portion structure comprising:
an undercover that is fixed to a lower portion of a vehicle body, and that covers a bottom surface side of the vehicle body; and
rocker moldings that are fixed to the lower portion of the vehicle body, and are disposed at vehicle transverse direction outer sides of the undercover, and are provided from vehicle transverse direction outer sides of rockers, that extend in a vehicle longitudinal direction at both sides in a vehicle transverse direction at the lower portion of the vehicle body, to vehicle lower sides,
wherein
end portions at the vehicle transverse direction outer sides of the undercover, and end portions at vehicle transverse direction inner sides of the rocker moldings, are superposed one on another at least in a vehicle vertical direction,
mounting portions to the vehicle body are provided so as to project-out at one of the end portions at the vehicle transverse direction outer sides of the undercover and the end portions at the vehicle transverse direction inner sides of the rocker moldings,
cut-outs, whose opening surface areas are smaller than surface areas of the mounting portions, are formed in another of the end portions at the vehicle transverse direction outer sides of the undercover and the end portions at the vehicle transverse direction inner sides of the rocker moldings, and
the mounting portions are superposed on vehicle inner sides of edge portions of the cut-outs.

3. The vehicle lower portion structure of claim 1, wherein, among terminal ends at the vehicle transverse direction outer sides of the undercover and terminal ends at the vehicle transverse direction inner sides of the rocker moldings, terminal ends at sides that are exposed to vehicle outer sides are positioned further toward a vehicle upper side than lower ends of the rocker moldings.

* * * * *